April 7, 1942.  E. M. BERTRÁN  2,278,910
AIRPLANE GEAR
Filed Oct. 9, 1940  2 Sheets-Sheet 1

INVENTOR
EDWARD M. BERTRAN
BY
Beau, Brooks, Buckley & Beau.
ATTORNEYS

April 7, 1942.  E. M. BERTRÁN  2,278,910
AIRPLANE GEAR
Filed Oct. 9, 1940  2 Sheets-Sheet 2
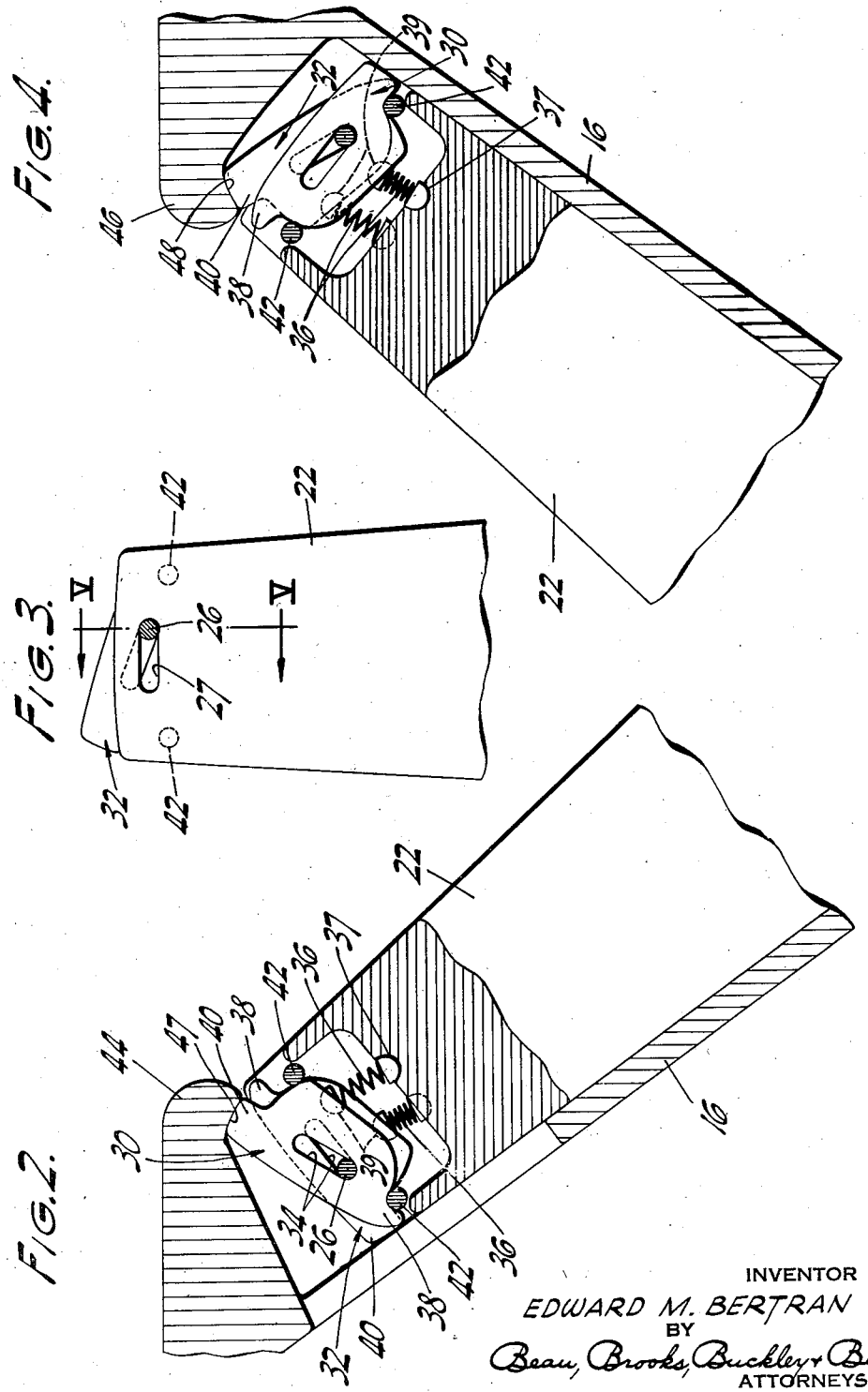
INVENTOR
EDWARD M. BERTRAN
BY
Beau, Brooks, Buckley r Beau.
ATTORNEYS Patented Apr. 7, 1942

2,278,910

UNITED STATES PATENT OFFICE 2,278,910

AIRPLANE GEAR

Edward M. Bertrán, Flushing, N. Y., assignor to Brewster Aeronautical Corporation, Long Island City, N. Y.

Application October 9, 1940, Serial No. 360,441

8 Claims. (Cl. 244—102)

This invention relates to airplane gear, and more particularly to self locking and self unlocking gear for airplane undercarriages and the like.

One of the objects of the invention is to provide an improved retractible airplane landing gear of sturdy and simplified form. Another object of the invention is to provide a retractible airplane landing gear including a novel self locking and self unlocking means. Other objects and advantages of the invention will appear from the specification hereinafter.

In the drawings:

Fig. 2 is an enlarged view of a detail of Fig. 1, with portions broken away to show the interior of the locking means thereof when the landing gear is locked in its extended position;

Fig. 3 is an elevation corresponding to Fig 2 of a portion of the gear and locking means when the gear is in a position intermediate of extended and retracted positions;

Fig. 4 is a view corresponding to Figs. 2 and 3 showing certain elements of the mechanism when the gear is locked in its retracted position.

Figure 1:
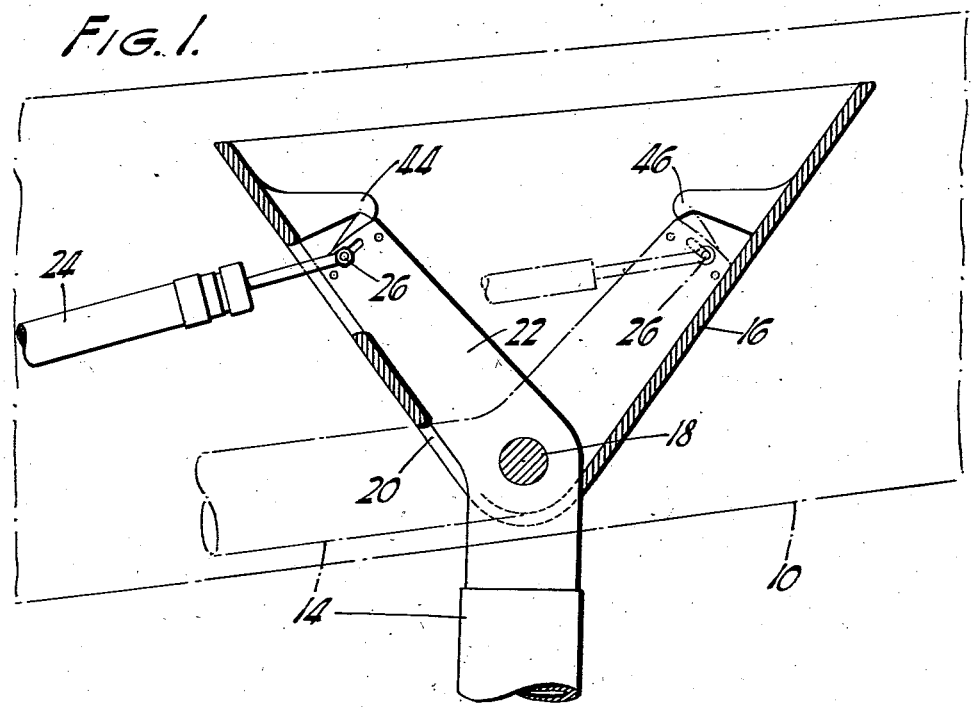
Fig. 1 is a fragmentary front elevation of an airplane showing a landing gear structure of the invention with portions of the gear supporting structure in section to show corresponding positions of certain elements of the gear when in extended and retracted positions.

The invention is illustrated herein as comprising a landing wheel gear mounted upon an airplane wing panel designated by the numeral 10 (Fig. 1). The gear comprises generally a landing wheel 12 supported upon a strut 14 which may be generally of any desired form and may include, for example, hydraulic shock absorbing means (not shown) or the like. The strut 14 is pivotally mounted adjacent its upper end upon a bracket 16 which is fixed to the airplane wing; the pivotal mounting of the strut upon the bracket being provided by means of a pivot pin 18 having its axis disposed substantially longitudinally of the airplane. The bracket 16 is generally of V-shaped sectional form when viewed transversely of the pivot axis 18 and is cut away as at 20 to permit the strut 14 to extend thereinto and to pivot upon the pin 18 from the extended solid line position thereof to the retracted broken line position thereof illustrated in Fig. 1. The strut 14 is provided at its upper end with a crank portion 22 extending upwardly therebeyond but at an angle from the longitudinal axis of the strut 14 equal to one-half of the angle of pivotal movement necessary to motivate the strut 14 from extended to fully retracted position. Consequently, the crank arm 22 moves through an arc symmetrical about the axis of the strut 14 when in extended position, between the solid and broken line positions thereof as illustrated in Fig. 1 during movement between gear extended and retracted positions.

To actuate the gear a hydraulic jack 24 is pivotally connected at one of its ends to a fixed portion of the airplane wing by a suitable connection device (not shown) and is pivotally connected at its other end to the crank arm 22 by means of a pin 26 extending transversely through slotted outer portions 27 of the crank arm 22. The hydraulic jack 24 is arranged to be operated by hydraulic pressure applied thereto in the well known manner and actuated by means of a control device of any suitable form (not shown) located within the pilot cockpit of the airplane. Thus, the hydraulic jack is adapted to be extended to actuate the crank arm 22 from the solid line position thereof to the broken line position thereof in Fig. 1, and to be retracted to actuate the crank arm 22 in reverse direction, whereby the airplane landing gear may be moved between extended and retracted positions as the pilot may require.

To lock the gear in either extended or retracted positions the crank arm 22 is recessed at its upper end to carry therewithin a pair of parallel tumblers 30 and 32 which are of plate metal form and arranged in sliding and pivotable relation upon the pin 26 by means of apertures 34 disposed centrally of the tumblers. The apertures 34 are elongated transversely of the longitudinal axis of the crank arm 22 to allow the pin 26 to slide therewithin. A spring push device 36 is arranged below each of the tumblers in such manner as to bear upwardly thereagainst in all positions of their pivotable adjustments within the crank arm, the spring devices 36 being mounted at their lower ends in socket portions 37 of the crank arm 22 and at their upper ends in socket portions 39 of the tumbler members. The tumblers are each provided with overhanging abutment portions 38 and 40 at opposite ends thereof which are adapted to coact with abutment pins 42 extending transversely through the crank arm 22 so as to stop pivotable movements of the tumblers upon the pin 26 within the limits illustrated in Figs. 2 and 4. The fixed bracket 16 is formed with an abutment 44 adjacent the upper outer end of the crank arm 22 when the gear is in its extended position, and a similar abutment portion 46 is provided adjacent the upper outer end of the crank arm 22 when the gear is in its retracted condition; the abutment portions 44 and 46 being provided with inner faces 47 and 48, respectively, shaped complementary to and in registry with the corresponding outer end portions of the abutments 40 of the tumblers 30 and 32, respectively. Hence, unless otherwise restrained, the tumblers 30 and 32 are freely pivotable upon the pin 26 within limits defined by coaction of the abutment portions 38 and 40 with the abutment pins 42 in such manner that the tumbler 30 is adapted to move so as to lock the crank arm 22 behind the abutment 44 of the fixed bracket as illustrated in Fig. 2, and the tumbler 32 is adapted to move so as to lock the crank arm 22 behind the abutment portion 46 of the fixed bracket as illustrated in Fig. 4.

The operation of the device will now be described beginning with the condition wherein the gear is locked in extended position as illustrated in solid lines in Fig. 1, and the locking mechanism is in the condition illustrated in Fig. 2. In this position of the mechanism the crank arm 22 is resting against the left side portion of the fixed bracket 16 as viewed in the drawings, and the pin 26 is positioned by the hydraulic jack 24 at its furthermost position of travel to the left. Consequently, the center of force of the spring device 36 acting against the underside of the tumbler 30 is substantially to the right of the pin 26, and in response thereto the tumbler 30 has been pivoted upon the pin 26 so that its abutment portion 40 projects upwardly into registry with the abutment portion 44 of the fixed bracket, as illustrated in Figs. 1 and 2, thus firmly locking the crank arm 22 to the left side portion of the fixed bracket 16, and in this condition the device is stable and external forces upon the landing gear are taken by the bracket 16 and are not transmitted to the hydraulic actuating portion of the gear.

Upon actuation of the hydraulic jack 24 by the pilot control means in such manner as to exert hydraulic pressure forces upon the pin 26 toward the right as viewed in the figures, the pin 26 initially moves in the slots 27 of the crank arm structure from the left hand end thereof toward the right hand end thereof, and as the pin 26 so moves it slides within the aperture 34 of the tumbler 30 in such manner as to cam the right hand end of the tumbler 30 downwardly against the action of the corresponding spring device 36 out of engagement with the abutment 44, and into an attitude as illustrated in Fig. 4. Thus, the crank arm 22 is now freed to move toward the right under the force of the hydraulic jack exerted through the pin 26 bearing against the crank arm at the right hand end of the slotted portions 27.

Figure 5:
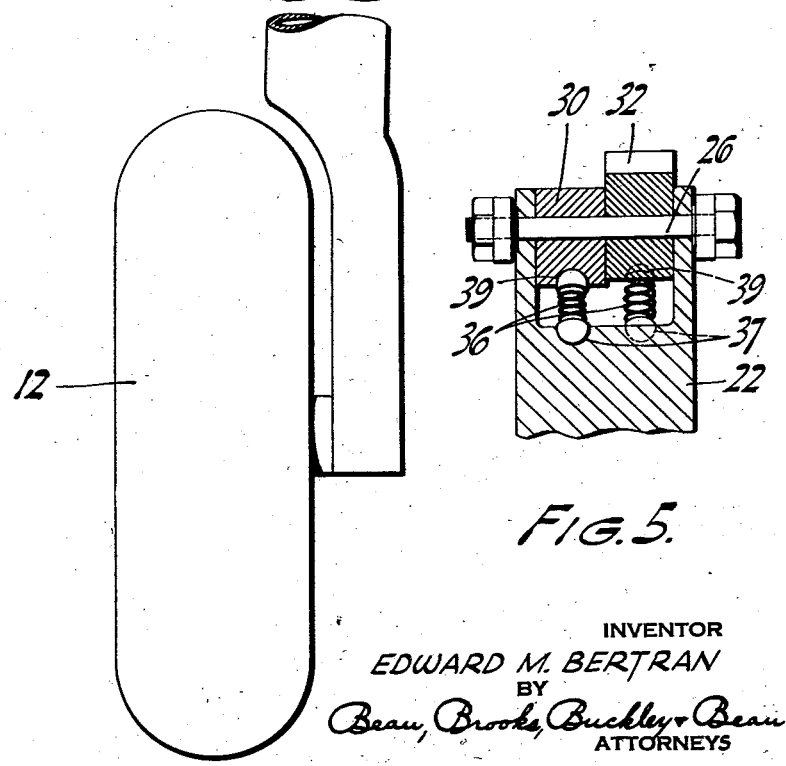
Fig. 5 is a fragmentary section taken substantially along line V—V of Fig. 3.

It will be noted that as the pin 26 moves from left to right within the aperture 34 of the tumbler 30 the pin simultaneously moves within the aperture 34 of the tumbler 32 until it is disposed within the right hand end of the aperture, whereupon the center of the force of the spring device 36 bearing upwardly against the underside of the tumbler 32 is disposed substantially to the left of the pin 26, causing the tumbler 32 to pivot about the pin 26 to the position illustrated in Figs. 3, 4 and 5. However, as the gear moves toward the position of Fig. 4 the upwardly tilted tumbler 32 will provide no appreciable interference with the movement of the gear under the abutment 46 because the tumbler 32 will simply be temporarily depressed from the position of Fig. 3 as it passes under the abutment portion 46 until the latter is cleared, whereupon the tumbler 32 will spring upwardly under the action of the spring 36 into the gear locked position of Fig. 4. Thus, the gear will become automatically locked in its fully retracted position wherein the loads of the gear are again taken by the bracket 16 and removed from the pin 26.

During reverse movement of the landing gear actuating mechanism commencing from the position of Fig. 4, the force of the hydraulic jack 24 acting upon the pin 26 will be directed from right to left as viewed in the figures. Thus, the first reaction of the landing gear extending motion of the hydraulic jack device will be expressed in a sliding movement of the pin 26 relative to the crank arm 22 within the slots 27 so as to cam the upwardly tilted end of the tumbler 32 downwardly out of engagement with the fixed abutment 46, thereby unlocking the gear. Further movement of the pin 26 as the result of the hydraulic jack action will be transmitted directly to the crank arm 22 in such manner as to pull the latter from right to left as viewed in the figures so as to pivot the landing gear strut 14 about the pivot pin 18 toward its extended position. During the gear unlocking movement of the pin 26 it moves to the left of the center of pressure of the associated spring device 36 against the tumbler 30, whereupon the spring device is released to urge the right hand end of the tumbler 30 upwardly toward the locking position thereof, as illustrated in Fig. 2. Consequently, during movement of the crank arm 22 from the position of Fig. 4 toward the position of Fig. 2 the right hand end of the tumbler 30 will be extended beyond the upper end of the crank arm. However, as the crank arm moves into final gear extended position under the abutment portion 44 of the fixed bracket the upper surface of the tumbler 30 will slide under the abutment 44 to be temporarily depressed thereby against the action of the spring device 36 until the abutment is cleared, whereupon the tumbler will snap upwardly again into the position of Fig. 2 whereupon the gear is again locked in its extended position.

Thus, it will be understood that the invention provides a rugged and simplified and otherwise improved airplane retractible type landing gear and supporting and actuating means therefor; all of the parts of which are adapted to be disposed compactly within restricted spaces such as are afforded by the interior of an airplane wing or the like, when in retracted condition. Also, the invention provides a completely automatic locking and unlocking mechanism whereby service loads upon the gear are prevented from dislodging the gear from either extended or retracted position. Simple actuation of the gear moving devices automatically procures unlocking of the gear elements so as to be freely movable from extended to retracted position, and vice versa. Thus, the pilot of the airplane is relieved of necessity of manually operating locking and unlocking devices for the landing gear prior to and subsequent to gear moving operations.

It will be understood that the gear locking mechanism of the invention is applicable with equal facility in connection with retractible gear arrangements differing in detail from that illustrated and described hereinabove. For example, it may be employed in conjunction with the presently popular folding strut type of gear, or the like. It will also be understood that in lieu of the specific form of spring devices 36 illustrated herein and described hereinabove, any other suitable form of resilient force members may be employed to actuate the tumblers for the purpose described.

Although only one form of the invention has been shown and described in detail, it will be apparent to those skilled in the art that the invention is not so limited but that various changes may be made therein without departing from the spirit of the invention or the scope of the appended claims.

I claim:

1. An airplane including a substantially horizontally disposed wing portion, a bracket fixedly mounted entirely within the outer contour of said wing portion, said bracket being of box-like form and V-shaped in vertical section transversely of the longitudinal axis of the airplane and provided with an aperture through the lowermost apex portion and an adjacent side wall portion thereof, and a retractible undercarriage strut extending from below said wing panel and through said aperture into pivotable mounting upon said bracket about an axis disposed substantially longitudinally of the airplane and extending through said bracket whereby said strut is pivotable about said axis between substantially vertical downwardly extended position and a substantially horizontal position of retraction within said wing panel, said strut being provided with an upright arm portion extending beyond said pivot axis and disposed angularly with respect to the longitudinal axis of said strut so as to be adapted to fit in complementing relation against the opposite inclined side wall portions of said bracket under strut extended and retracted conditions, and motor means disposed within said wing panel outer contour and arranged in operative association with said arm so as to be adapted to actuate said arm so as to pivot said strut between extended and retracted positions.

2. An airplane including a substantially horizontally disposed wing portion, a bracket fixedly mounted entirely within the outer contour of said wing portion, said bracket being of box-like form and having opposite side walls extending in upwardly diverging relation from a lower apex portion so as to include an angle equal to 90 degrees less the angle of dihedral of said wing portion and provided with an aperture through the lowermost apex portion and an adjacent side wall portion thereof, and a retractible undercarriage strut extending from below said wing panel and through said aperture into pivotable mounting upon said bracket about an axis disposed substantially longitudinally of the airplane and extending through said bracket whereby said strut is pivotable about said axis between substantially vertical downwardly extended position and a substantially horizontal position of retraction within said wing panel, said strut being provided with an upright arm portion extending beyond said pivot axis and disposed angularly with respect to the longitudinal xis of said strut so as to be adapted to fit in complementing relation against the opposite inclined side wall portions of said bracket under strut extended and retracted conditions, and motor means disposed within said wing panel outer contour and arranged in operative association with said arm so as to be adapted to actuate said arm so as to pivot said strut between extended and retracted positions.

3. In an airplane landing gear, a member movable to procure extending and retracting movements of the landing gear, means for imparting movement to said movable member connected thereto by means of a lost motion connection device, a tumbler pivotally mounted upon said movable member and operatively associated with said connection device so as to be pivotable thereby in such manner as to move into and out of engagement with a fixed abutment extending from a stationary portion of said airplane for automatically locking and unlocking said movable member relative to said airplane in response to action of said movement imparting means, said tumbler having a laterally elongate opening centrally thereof for pivotal and slidable mounting upon said connection device, and an elastic force member operatively associated with said tumbler in such manner as to be adapted to resiliently urge said tumbler normally into abutment locking position and to be overcome by actuation of said connection device so as to permit said tumbler to be moved into unlocking position.

4. In an airplane landing gear, a member movable toward and from a limit position, a fixed abutment adjacent said member when the latter is in said limit position, actuating means for moving the member away from said limit position and having a lost motion connection to said member comprising a pin engaging in an elongate slot in said member, a latch carried by said member for engaging said fixed abutment to lock the member in said limit position, said latch having an elongate slot receiving said pin and inclined in diverging relation to the slot in said member when the latch is engaged with said abutment, the pin coacting with the latch to retract the latter from locking engagement with the abutment during initial movement of the actuating means.

5. In an airplane landing gear, a member movable between spaced limit positions, fixed abutments adjacent the member when the latter is in each limit position, actuating means for moving the member between said limit positions and having a lost motion connection to said member comprising a pin engaging in an elongate slot in said member, a pair of latches carried by said member, each of said latches being engageable with one of said fixed abutments to lock the member in one of said limit positions, each latch having an elongate slot receiving said pin and inclined in a diverging relation to the slot in said member when the latch is engaged with the abutment therefor, the pin coacting with the engaged one of the latches to retract the latter from locking engagement with the abtument therefor during initial movement of the actuating means in each direction.

6. In an airplane landing gear, a member movable toward and from a limit position, a fixed abutment adjacent said member when the latter is in said limit position, an actuating element for moving the member away from said limit position and having a lost motion connection to said member, a latch carried by said member for engaging said fixed abutment to lock the member in said limit position, said latch having an elongate slot inclined relative to the direction of lost motion movement of said actuating element, and a pin movable with said actuating element and engaged in said slot for coacting with the latch to retract the latter from locking engagement with the abutment during initial movement of the actuating means.

7. In an airplane landing gear, a member movable toward and from a limit position, a fixed abutment adjacent the member when the latter is in said limit position, actuating means for moving the member from said limit position and having a lost motion connection to said member comprising a pin engaging in an elongate slot in said member, a latch carried by said member and engageable with said fixed abutment to lock the member in said limit position, the latch having an elongate slot receiving said pin and inclined in diverging relation to the slot in said member when the latch is engaged with said abutment, the pin coacting with the engaged one of the latches to retract the latter from locking engagement with the abutment therefor during initial movement of the actuating means, and said member having a part engageable with a portion of the latch disposed to the side of the pin substantially diametrically opposed to the abutment when the latch is in locking position.

8. In an airplane landing gear, a member movable toward and from a limit position, a fixed abutment adjacent said member when the latter is in said limit position, an actuating element for moving the member away from said limit position and having a lost motion connection to said member, a latch carried by said member for engaging said fixed abutment to lock the member in said limit position, said latch having an elongate slot inclined relative to the direction of lost motion movement of said actuating element, a pin movable with said actuating element and engaged in said slot for coacting with the latch to retract the latter from locking engagement with the abutment during initial movement of the actuating means, and said member having a part engageable with a portion of the latch disposed to the side of the pin diametrically opposed to the abutment when the latch is in locking position.

EDWARD M. BERTRÁN.